(12) United States Patent
Jones

(10) Patent No.: US 10,046,623 B2
(45) Date of Patent: Aug. 14, 2018

(54) FITTING ASSEMBLY

(71) Applicant: Jaguar Land Rover Limited, Coventry (GB)

(72) Inventor: Ross Jones, Coventry (GB)

(73) Assignee: Jaguar Land Rover Limited, Whitley, Coventry (GB)

(*) Notice: Subject to any disclaimer, the term of this patent is extended or adjusted under 35 U.S.C. 154(b) by 0 days.

(21) Appl. No.: 15/323,624

(22) PCT Filed: Jul. 16, 2015

(86) PCT No.: PCT/EP2015/066336
§ 371 (c)(1),
(2) Date: Jan. 3, 2017

(87) PCT Pub. No.: WO2016/009003
PCT Pub. Date: Jan. 21, 2016

(65) Prior Publication Data
US 2017/0144517 A1    May 25, 2017

(30) Foreign Application Priority Data
Jul. 17, 2014   (GB) .................................. 1412688.2

(51) Int. Cl.
*B62D 27/00* (2006.01)
*B60J 5/10* (2006.01)
(Continued)

(52) U.S. Cl.
CPC ............ *B60J 5/107* (2013.01); *B62D 35/007* (2013.01); *F16B 5/0225* (2013.01); *F16B 5/0233* (2013.01)

(58) Field of Classification Search
CPC ....................................................... B60J 5/107
See application file for complete search history.

(56) References Cited

U.S. PATENT DOCUMENTS 3,579,942 A * 5/1971 Cole ..................... F16B 5/01
411/113
4,890,966 A * 1/1990 Umezawa ........... F16B 13/0808
24/289
(Continued)

FOREIGN PATENT DOCUMENTS

DE         202 13 362 U1    11/2002
DE    10 2012 009 173 A1    11/2012
(Continued)

OTHER PUBLICATIONS

Combined Search and Examination Report, GB Application No. 1412688.2, dated Jan. 20, 2015, 8 pages.
(Continued)

*Primary Examiner* — Lori L Lyjak
(74) *Attorney, Agent, or Firm* — Myers Bigel, P.A.

(57) ABSTRACT

A fitting assembly for receiving and restraining a stud includes a sleeve defining a bore extending along a longitudinal axis of the fitting assembly. The sleeve includes one or more restraining members that selectively restrain the stud within the bore such that an axial position of the stud is limited to a selected one of a plurality of positions within the bore. The one or more restraining members are moveable between a first position and a second position, wherein axial movement of the stud within the bore is inhibited when the one or more restraining members are in the first position, and wherein axial movement of the stud is permitted when the one or more restraining members are in the second position. A clamp attachable to the one or more restraining members prevents movement of the one or more restraining members from the first position to the second position.

20 Claims, 3 Drawing Sheets

(51) Int. Cl.
    *B62D 35/00* (2006.01)
    *F16B 5/02* (2006.01)

(56) References Cited

U.S. PATENT DOCUMENTS

| | | |
|---|---|---|
| 5,106,225 A | 4/1992 | Andre et al. |
| 5,651,632 A | 7/1997 | Gordon |
| 5,694,719 A * | 12/1997 | Bejune .................. B60J 5/0402 411/182 |
| 2010/0272503 A1 | 10/2010 | Pitsch et al. |
| 2010/0284763 A1 | 11/2010 | Busch |
| 2011/0044782 A1* | 2/2011 | Lange .................... F16B 5/065 411/2 |
| 2012/0230796 A1* | 9/2012 | McClure ............... F16B 5/0258 411/80.1 |
| 2013/0039718 A1* | 2/2013 | Fellows ................ F16B 37/043 411/112 |

FOREIGN PATENT DOCUMENTS

| | | |
|---|---|---|
| DE | 10 2011 104 385 A1 | 12/2012 |
| DE | 10 2011 104 386 A1 | 12/2012 |
| EP | 1 473 470 A1 | 11/2004 |
| FR | 2 540 948 A2 | 8/1984 |
| JP | 2000-352408 A | 12/2000 |
| KR | 10-0873595 B1 | 12/2008 |
| WO | WO 82/00809 | 3/1982 |

OTHER PUBLICATIONS

Combined Search and Examination Report, GB Application No. 1512459.7, dated Jan. 13, 2016, 8 pages.
Notification of Transmittal of the International Search Report and the Written Opinion of the International Searching Authority, or the Declaration, PCT/EP2015/066336, dated Oct. 16, 2015, 10 pages.

* cited by examiner

FITTING ASSEMBLY

RELATED APPLICATIONS

This application is a 35 U.S.C. § 371 national stage application of PCT Application No. PCT/EP2015/066336, filed on Jul. 16, 2015, which claims priority from Great Britain Patent Application No. 1412688.2 filed on Jul. 17, 2014, the contents of which are incorporated herein by reference in their entireties. The above-referenced PCT International Application was published in the English language as International Publication No. WO 2016/009003 A1 on Jan. 21, 2016.

TECHNICAL FIELD

Aspects of the invention relate to a fitting assembly. Other aspects of the invention relate to a fixing system including a fitting assembly, and a vehicle including a fixing system.

BACKGROUND

Fitting assemblies are generally used for fixing one item to another. A known type of fitting assembly is used for affixing components to the body of a vehicle. During assembly it is often desirable to make adjustments to the fixing system to align the component to be fixed with certain features of the vehicle. However, in certain cases, simultaneous alignment of the component and adjustment of the fixing system may not be possible thereby necessitating iterative trial and error adjustments to achieve the desired alignment. As an example, where the component is a spoiler that is to be attached to the tailgate of a vehicle, current fixing systems require the tailgate to be open for adjustments to be made. However, when the tailgate is open, the spoiler cannot be aligned with the features of the vehicle that surround the spoiler when the tailgate is in its closed configuration (e.g. the sides and roof of the vehicle). Consequently, any adjustment made to the fixing system (e.g. to alter the distance between the spoiler and the tailgate) must be made whilst the tailgate is open and be followed by a subsequent inspection with the tailgate closed to assess whether the desired alignment has been achieved. If the desired alignment has not been achieved, the tailgate must be opened again for a further adjustment to be made followed by a further inspection with the tailgate closed. This process must be repeated until the desired alignment is achieved.

It is an object of embodiments of the invention to at least mitigate one or more of the problems of the prior art.

SUMMARY OF THE INVENTION

According to an aspect of the present invention, there is provided a fitting assembly for receiving and restraining a stud, the fitting assembly comprising a sleeve defining a bore extending along a longitudinal axis of the fitting assembly, the sleeve including restraining means for selectively restraining a stud received in the bore, wherein the restraining means are moveable between a first position and a second position, where in the first position axial movement of a stud received in the bore is inhibited and in the second position axial movement of a stud received in the bore is permitted, where the sleeve is clampable by clamping means for preventing movement of the restraining means to the second position, such that the axial position of the stud is limited to a selected one of a plurality of possible positions within the bore.

As a result, a stud (and a component attached to the stud) may be set in a desired configuration relative to the fitting assembly (and any component that the fitting assembly may be fixed relative to) prior to the sleeve being clamped. The stud may be moved between a plurality of possible positions within the bore such that it is moved into a desired position. Then the sleeve may be clamped such that the stud is retained in the desired position.

The restraining means may comprise one or more radially moveable portions and the first position is a radially inward position of the one or more radially moveable portions and the second position is a radially outward position of the one or more radially moveable portions. The one or more radially moveable portions may comprise one or more radially moveable fingers. Additionally or alternatively, the one or more radially moveable portions may include one or more radially inward projections that are configured to engage with one or more radially outward projections on a stud so as to inhibit axial movement of the stud when received in the bore. Alternatively, the one or more radially moveable portions may engage with the stud by means of an interference fit.

Therefore the plurality of possible positions which the stud may assume in the bore may be continuous, such that the stud may occupy any of the range of positions between two extremes. Alternatively, the plurality of possible positions which the stud may assume in the bore may be discreet, such that the stud may occupy several separated positions which lie between two extremes.

The one or more radially inward projections may comprise a plurality of teeth. The one or more radially inward projections may be tapered in an axial direction so that an axial force applied to the one or more radially inward projections causes a camming action that flexes the one or more radially moveable portions radially outwardly. The one or more radially inward projections may each have a first face that is inclined relative to the longitudinal axis by a first angle and a second face that is inclined relative to the longitudinal axis by a second angle that is greater than the first angle, such that a first axial force applied to one or more of the first faces is required to cause a camming action that flexes the one or more radially moveable portions to the radially outward position, and a second axial force applied to one or more of the second faces is required to cause a camming action that flexes the one or more radially moveable portions to the radially outward position, wherein the second axial force is greater than the first axial force.

The fitting assembly may comprise a flange radially projecting from the sleeve.

The restraining means may be moveable so as to be configured for receiving a stud having a diameter of between 5 mm and 10 mm in the bore. In one embodiment, the restraining means may be moveable so as to be configured for receiving a stud having a diameter of about 6 mm in the bore. In an another embodiment, the restraining means may be moveable so as to be configured for receiving a stud having a diameter of about 8 mm in the bore.

In certain embodiments, the sleeve may be made of a polymer, in particular of nylon. In other embodiments, the sleeve may be made of a metal.

An outer surface of the sleeve may be provided with a male screw thread and may be configured for receiving the clamping means, which may be provided with a female screw thread, thereabout.

The clamping means prevents movement of the restraining means to the second position so as to inhibit axial movement along the longitudinal axis of a stud received in the bore.

The clamping means may comprise a screw threaded locking nut configured to be received on the screw threaded outer surface of the sleeve.

According to another aspect of the present invention, there is provided a fixing system comprising the above-described fitting assembly and a stud for being received and restrained in the bore of the fitting.

The stud may have a diameter of between 5 mm and 10 mm. In certain embodiments, the stud may have a diameter of 6 mm or 8 mm. The stud may include one or more radially outward projections. The one or more radially outward projections may include a screw thread on an outer surface of the stud.

According to another aspect of the present invention, there is provided a fixing system comprising the above-described fitting assembly and a panel having an aperture for receiving the sleeve of the fitting.

The aperture may be shaped so as to substantially prevent the sleeve from moving relative to the panel in directions parallel to the plane of the panel.

Alternatively, the aperture may be a slot that is shaped so as to permit movement of the sleeve relative to the panel along a single axis that is parallel to the plane of the panel.

The panel may be a tailgate panel of a vehicle.

The fixing system may comprise a stud for being received and restrained in the bore of the fitting. The stud may be connectable to a vehicle spoiler. In certain embodiments, the stud may be connected to a vehicle spoiler.

According to another aspect of the present invention, there is provided a vehicle comprising the above-described fixing system.

BRIEF DESCRIPTION OF THE DRAWINGS

One or more embodiments of the invention will now be described, by way of example only, with reference to the accompanying drawings, in which.

DETAILED DESCRIPTION

Figure 1:
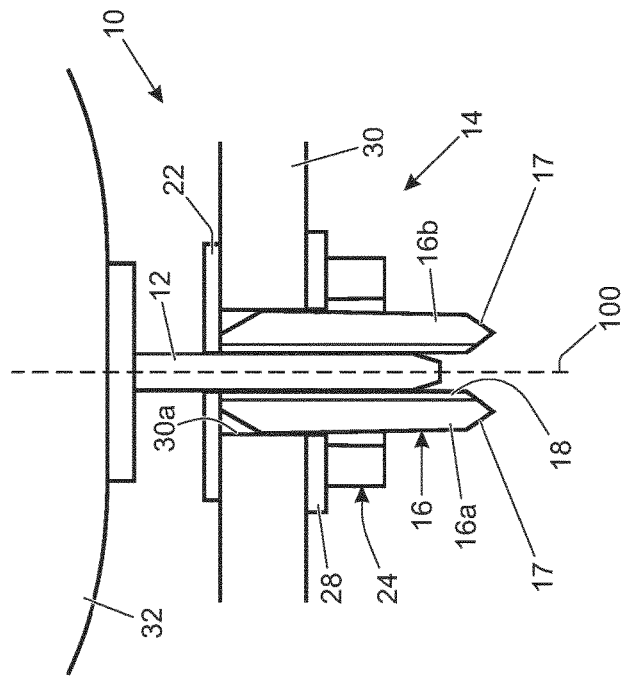
FIG. 1 shows a cross-sectional view of a fixing system according to an embodiment of the invention prior to clamping.
Figure 5:
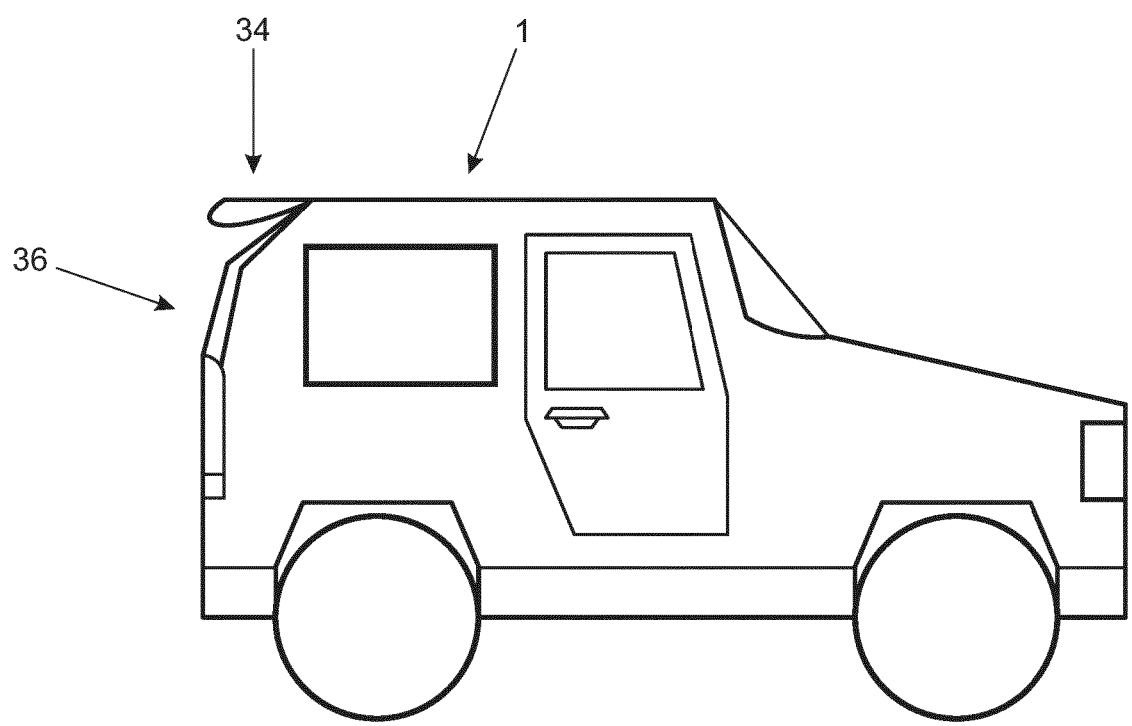
FIG. 5 shows a vehicle of the invention.

FIG. 1 shows a cross-sectional view of a fixing system 10 in accordance with an embodiment of the present invention. In the embodiment shown in FIG. 1, the fixing system 10 includes a stud 12 and a fitting assembly 14 that comprises a sleeve 16 and a clamping means in the form of a nut 24. In the configuration shown in FIG. 1, the fixing system 10 is partway through a fixing process where the stud 12 is not yet fixed relative to the fitting assembly 14. The sleeve 16 of the fitting assembly 14 is received in an aperture 30a of a panel 30 and the stud 12 is connected to a component 32 that is to be attached to the panel 30 by the fixing system 10. In one non-limiting example, the component 32 may be a spoiler 34 and the panel 30 may be part of a tailgate 36 of a vehicle 1 (see FIG. 5).

The sleeve 16 has an inner surface 18 that defines a bore that extends along a longitudinal axis 100 of the fitting assembly 14.

Throughout the present specification, the terms 'axial', 'axially' and similar terms are used to denote directions parallel to the longitudinal axis 100. The terms 'radial', 'radially', and similar terms are used to denote any direction that is perpendicular to the longitudinal axis 100 where a radially inward direction is towards the longitudinal axis 100 and a radially outward direction is away from the longitudinal axis 100.

The bore has an opening 14a that permits the stud 12 to be received in the bore. The sleeve 16 includes restraining means (or one or more restraining members) for selectively restraining the stud 12 when in the bore. In the embodiment shown in the Figures, the restraining means are in the form of a first radially flexible finger 16a and a second radially flexible finger 16b where each of the first radially flexible finger 16a and the second radially flexible finger 16b is radially moveable between a radially inward position and a radially outward position.

Figure 3B:
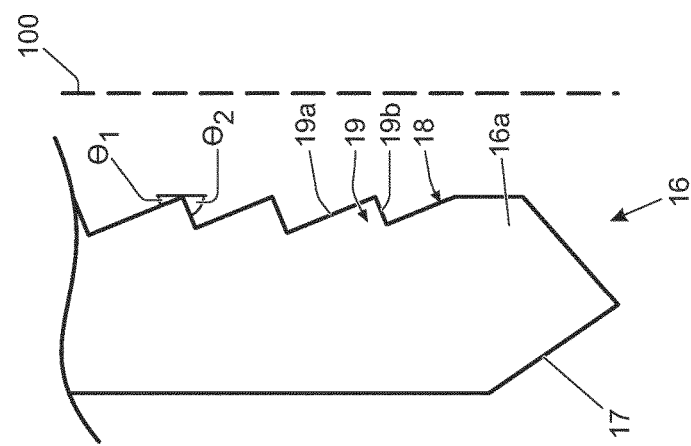
FIG. 3B shows a detailed partial view of the first radially flexible finger of a fitting assembly in accordance with an alternative embodiment of the invention.
Figure 3A:
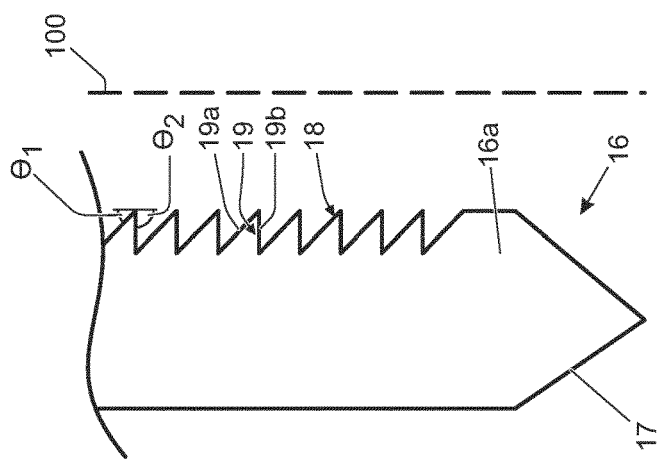
FIG. 3A shows a detailed partial view of the first radially flexible finger of a fitting assembly in accordance with an embodiment of the invention.

As shown in FIG. 3A, the inner surface 18 of the sleeve 16 includes a plurality of teeth 19 that each project radially inwardly into the bore. The teeth 19 form a ratchet where each of the teeth 19 has a first face 19a that tapers radially in an axial direction (forming an angle $\theta_1$ with the longitudinal axis 100) and a second face 19b that extends in a substantially radial direction (forming an angle $\theta_2$ with the longitudinal axis 100 of about 90° thereby not being tapered radially in an axial direction).

In certain embodiments the stud 12 may be a threaded stud or otherwise have radially outward projections. In such embodiments, the stud 12 may be inserted into the bore via the opening 14a and the thread or other radial projections of the stud 12 may contact the first face 19a of a first of the teeth 19. Due to the angled profile of the first face 19a, the axial force applied to the first face 19a by the thread or other radial projection of the stud 12 causes a camming action whereby the first and second radially flexible fingers 16a, 16b flex radially outwardly from the radially inward position to the radially outward position and permit axial movement of the stud 12 into the bore. The first and second radially flexible fingers 16a,16b are resilient and so are biased back towards their relaxed un-flexed position when flexed away therefrom. By resilient it is meant that the radially flexible fingers are not deformed past their elastic limit to an extent that prevents the teeth 19 thereon from engaging with the projections on the stud 12. Therefore, once the thread or other radial projection of the stud 12 has passed a given one of the teeth 19, the first and second flexible fingers 16a,16b relax back to the radially inward position. In the radially inward position, the presence of the teeth 19 inhibits free axial movement of the stud 12. Axial movement of the stud 12 into the bore is only permitted when a sufficient axial force is applied by the stud 12. In the specific non-limiting embodiment shown in the Figures, axial movement of the stud 12 in the bore is only permitted when a sufficient axial force is applied by the stud 12 onto the teeth 19 such that one or each of the first and second fingers 16a,16b are caused to flex to the radially outward position. In the absence of such a sufficient axial force, the stud 12 is restrained in the bore.

Due to the profile of the second face 19b of each of the teeth 19 of FIG. 3A, an axial force applied to the second faces 19b does not result in a camming action and so does not cause radial movement of the first and second radially flexible fingers 16a,16b to the radially outward position. Consequently, once inserted in the bore via the opening 14a, the stud 12 may not be moved axially out of the bore through the opening 14a unless an external force is applied to move the first and second radially flexible fingers 16a,16b to the radially outward position.

In alternative embodiments, each of the teeth 19 may have two tapered faces so axial movement of the stud may be permitted in either direction if a sufficient axial force is applied to the stud 12 and the first and second flexible fingers 16a,16b are able to flex to the radially outward position.

An example of such an embodiment is shown in FIG. 3B where the first faces 19a of the teeth 19 are inclined at an angle $\theta_1$ relative to the longitudinal axis 100 and the second faces 19b of the teeth 19 are inclined at an angle $\theta_2$ relative to the longitudinal axis 100, where $\theta_2<90°$ and $\theta_1<\theta_2$. In this case, an axial force applied against the first faces 19a or second faces 19b would result in a camming action that causes radial movement of the first and second radially flexible fingers 16a,16b to the radially outward position. However, since $\theta_1<\theta_2$, a greater axial force applied against the second faces 19b is required in comparison with an axial force applied against the first faces 19a in order to cause the camming action. As a result, it is more difficult to move the stud 12 axially out of the bore through the opening 14a than it is to insert the stud 12 further into the bore.

In alternative embodiments within the scope of the present invention, the angles $\theta_1$ and $\theta_2$ of the first faces 19a and second faces 19b of the teeth 19 relative to the longitudinal axis 100, respectively, may be equal to one another such that axial movement of the stud 12 in the bore is equally permitted in either axial direction.

In certain embodiments, the first and second radially flexible fingers 16a,16b may, in their relaxed and un-flexed position, define a tapered bore that narrows in a direction away from the opening 14a to a diameter smaller than the diameter of the stud 12 to be received therein. In such embodiments, the first and second radially flexible fingers 16a,16b may flex radially outwardly to their first position to accommodate the stud 12 in the bore. With the stud 12 inserted into the bore, the first and second radially flexible fingers 16a,16b may already be flexed to some extent and further flexing is required in order to move to the radially outward position. Being flexed in the radially inward position has certain advantages in that the radially inwardly directed biasing force experienced by the flexed first and second radially flexible fingers 16a,16b facilitates reliable inhibition of axial movement of the stud 12 in the bore. Additionally, the radially outward flexing caused by the presence of the stud 12 in the bore may permit the sleeve 16 to bear against the edges of the aperture 30a of the panel 30 thereby limiting undesirable movement of the sleeve 16 relative to the panel 30. In any embodiment, it may be advantageous if the sleeve 16 is a close fit in the aperture 30a of the panel 30 such that movement (including axial movement) of the fitting assembly 14 in the aperture 30a is limited by a frictional engagement between the fitting assembly 14 and the aperture 30a. Such frictional engagement serves to minimise any misalignment of the component relative to the panel 30 and surrounding features.

In the embodiment shown in the Figures, the fitting assembly 14 additionally includes a flange 22 that projects radially outwardly from the sleeve 16 and has a diameter greater than the diameter of the aperture 30a in the panel 30. The flange 22 therefore limits movement of the fitting assembly 14 relative to the panel 30 in an axially downward direction when the flange 22 abuts the surface of the panel 30, This inhibition of relative movement between the fitting assembly 14 and the panel 30 further serves to minimise any misalignment of the component relative to the panel 30 and surrounding features.

The stud 12 is inserted into the bore so as to achieve the desired spacing between the component 32 and the panel 30. The desired spacing may be achieved by aligning the component 32 with another feature (e.g. another feature of a vehicle 1). Once the desired spacing is achieved, the sleeve 16 may be clamped using the nut 24. In particular, the nut 24 has an internal screw thread 26 that has a suitable diameter so as to be receivable on an external screw thread 20 of the sleeve 16. An outer surface of the sleeve 16 may include a tapered portion 17 to facilitate location of the nut 24 on the sleeve 16. The nut 24 is sized so that once received on the external screw thread 20 of the sleeve 16, the nut 24 prevents the first and second radially flexible fingers 16a, 16b from moving to the radially outward position. Therefore, with the nut 24 screwed onto the sleeve 16, the sleeve 16 is clamped and the stud is unable to move axially out of the bore.

The fixing system 10 permits the component 32 to be aligned as desired and the first and second radially flexible fingers 16a,16b (and the ratchet formed by the teeth 19 in particular) support the weight of the component 32 so that the component 32 remains in the desired aligned position until the sleeve 16 is clamped. Therefore, component 32 is held in place relative to the panel 30 even if the panel 30 needs to be moved in order to clamp the sleeve 16. This is particularly advantageous since adjustments may be made to achieve the desired alignment whilst the panel 30 is in situ and the component 32 remains in place if the panel 30 needs to be moved in order to clamp the sleeve 16. Thus, the trial and error procedure associated with prior art arrangements may be avoided. The fixing system 10 in accordance with certain embodiments of the present invention is suitable for affixing components (such as a spoiler 34) to the tailgate 36 of a vehicle 1.

Figure 2:
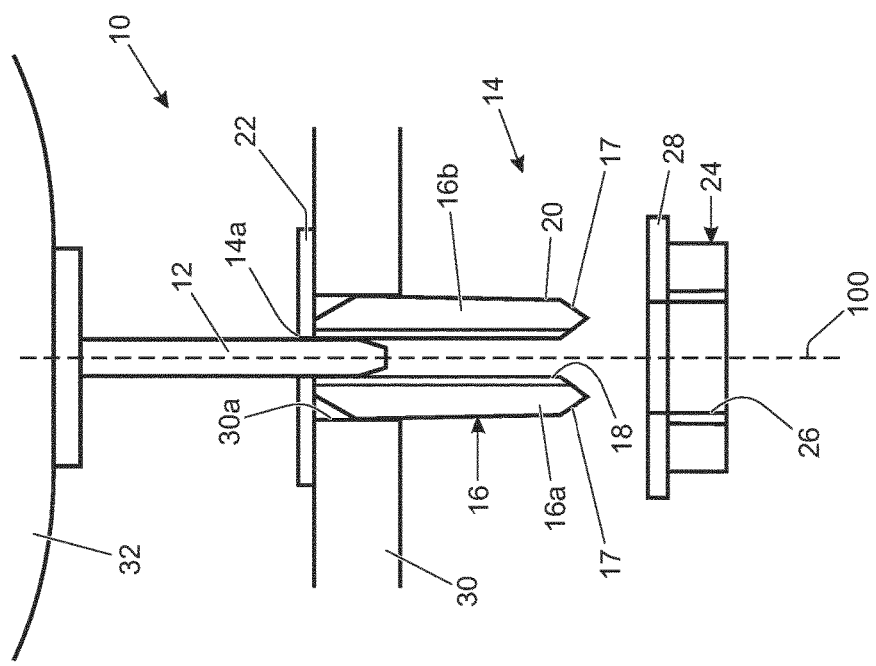
FIG. 2 shows a cross-sectional view of the fixing system of FIG. 1 in a clamped configuration.

FIG. 2 shows the fixing system 10 where the stud 12 is received in the bore and the nut 24 is received on the sleeve 16 so as to prevent the first and second radially flexible fingers 16a,16b from moving to the radially outward position. In this configuration, the sleeve 16 is axially restrained relative to the panel 30 by the flange 22 and nut 24. In the embodiment shown in the Figures, the nut 24 additionally includes a nut flange 28 that projects radially outwardly and provides a larger surface area for the nut 24 to bear against the panel 30. Since the component 32 is fixed relative to the stud 12 which is axially restrained relative to the fitting assembly 14, and the fitting assembly 14 is axially restrained relative to the panel 30, the component 32 is axially restrained relative to the panel 30.

Figure 4:
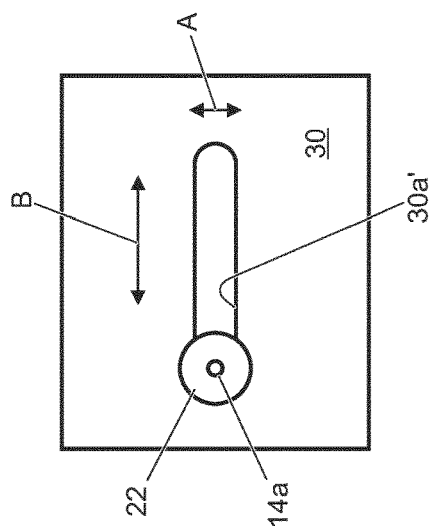
FIG. 4 shows a top down view of a fitting assembly in accordance with an embodiment of the invention in an elongate slot in a panel.

In certain embodiments, the aperture 30a in the panel 30 may be a circular aperture such that the sleeve 16 is substantially prevented from moving laterally along all radial directions relative to the panel 30 (i.e. parallel to the plane of the panel 30). In other embodiments, the aperture 30a may be non-circular. FIG. 4 shows an aperture 30a' that is non-circular in accordance with an embodiment of the present invention. The aperture 30a' is an elongate slot that inhibits lateral movement of the sleeve 16 along a first axis A relative to the panel 30 but permits lateral movement of the sleeve 16 relative to the panel 30 along a second axis B that is perpendicular to the first axis A. Such additional permissible movement may be advantageous in alignment of the component relative the panel 30 (and/or other features).

It will be appreciated that the restraining means are not limited to comprising the first radially flexible finger 16*a* and the second radially flexible finger 16*b*. Within the scope of the present invention, the restraining means may comprise any suitable component or mechanism that is moveable between a first position and a second position, where in the first position axial movement of a stud received in the bore is inhibited and in the second position axial movement of a stud received in the bore is permitted, and where clamping of the sleeve prevents the restraining means from moving to the second position. The restraining means may include any suitable one or more restraining portions. The one or more restraining portions may comprise one or more radially moveable portions which may be one or more radially moveable fingers.

The one or more radially moveable portions may include one or more radially inward projections that are configured to engage with one or more radially outward projections on the stud so as to inhibit axial movement of the stud when received in the bore. In alternative embodiments, the restraining means may inhibit axial movement of the stud by other mechanisms. For example, in the first position, the restraining means may inhibit axial movement of the stud in the bore by frictional engagement where in the second position any frictional engagement is insufficient to inhibit axial movement of the stud in the bore. In certain embodiments, the restraining means may be moved from the first position to the second position upon a sufficient axial force being applied to the stud when in the bore and when the restraining means are not clamped. In certain embodiments, the restraining means may be configured such that an axial force applied to the stud may cause the restraining means to be moved from the first position to the second position when applied in one axial direction, but not when applied in the opposite axial direction.

The clamping means may be any suitable clamp that may be applied to the sleeve 16 so as to prevent the restraining means from moving to the second position, and are not limited to the nut 24 described above.

The stud 12 may be any suitable component that may be received in the bore and restrained therein. In certain embodiments, the stud 12 is a threaded stud. In other embodiments, the stud 12 is not a threaded stud but includes one or more radially outward projections. In particular embodiments, the stud 12 may have a diameter between 5 mm and 10 mm. In one example, the stud 12 may have a diameter of 6 mm (e.g. be a M6 stud). In another example, the stud 12 may have a diameter of 8 mm (e.g. be a M8 stud).

The sleeve 16 may be made of any suitable material. In one example, the sleeve 16 is made of a metal. In another example, the sleeve 16 is made of a suitable non-metal such as nylon.

Certain aspects of the invention are defined in the numbered paragraphs below.

1. A fitting assembly for receiving and restraining a stud, the fitting assembly comprising a sleeve defining a bore extending along a longitudinal axis of the fitting assembly, the sleeve including one or more restraining members for selectively restraining a stud received in the bore, wherein the one or more restraining members are moveable between a first position and a second position, where in the first position axial movement of a stud received in the bore is inhibited and in the second position axial movement of a stud received in the bore is permitted, where the sleeve is clampable by a clamp for preventing movement of the one or more restraining members to the second position, such that the axial position of the stud is limited to a selected one of a plurality of possible positions within the bore.

2. The fitting assembly of paragraph 1, wherein the one or more restraining members comprise one or more radially moveable portions and the first position is a radially inward position of the one or more radially moveable portions and the second position is a radially outward position of the one or more radially moveable portions.

3. The fitting assembly of paragraph 2, wherein the one or more radially moveable portions comprise one or more radially moveable fingers.

4. The fitting assembly of paragraph 2, wherein the one or more radially moveable portions include one or more radially inward projections that are configured to engage with one or more radially outward projections on a stud so as to inhibit axial movement of the stud when received in the bore.

5. The fitting assembly of paragraph 4, wherein the one or more radially inward projections comprise a plurality of teeth.

6. The fitting assembly of paragraph 4, wherein the one or more radially inward projections are tapered in an axial direction so that an axial force applied to the one or more radially inward projections causes a camming action that flexes the one or more radially moveable portions radially outwardly.

7. The fitting assembly of paragraph 6, wherein the one or more radially inward projections each have a first face that is inclined relative to the longitudinal axis by a first angle and a second face that is inclined relative to the longitudinal axis by a second angle that is greater than the first angle, such that a first axial force applied to one or more of the first faces is required to cause a camming action that flexes the one or more radially moveable portions to the radially outward position, and a second axial force applied to one or more of the second faces is required to cause a camming action that flexes the one or more radially moveable portions to the radially outward position, wherein the second axial force is greater than the first axial force.

8. The fitting assembly of paragraph 1, comprising a flange radially projecting from the sleeve.

9. The fitting assembly of paragraph 1, wherein the one or more restraining members are moveable so as to be configured for receiving a stud having a diameter of between 5 mm and 10 mm in the bore.

10. The fitting assembly of paragraph 1, wherein the sleeve is made of one of a polymer a metal.

11. The fitting assembly of paragraph 1, wherein an outer surface of the sleeve is provided with a male screw thread and isaid clamp is provided with a female screw thread.

12. The fitting assembly of paragraph 1 wherein said clamp for preventing movement of the one or more restraining members to the second position inhibits axial movement along the longitudinal axis of a stud received in the bore.

13. The fitting assembly of paragraph 12 wherein said clamp comprises a screw threaded locking nut configured to be received on the screw threaded outer surface of the sleeve.

14. A fixing system comprising the fitting assembly of paragraph 1 and a stud for being received and restrained in the bore of the fitting.

15. The fixing system of paragraph 14, wherein the stud has a diameter of between 5 mm and 10 mm.

16. The fixing system of any of paragraph 14, wherein the stud includes one or more radially outward projections.

17. The fixing system of paragraph 16, wherein the one or more radially outward projections comprise a screw thread on an outer surface of the stud.

18. A fixing system comprising the fitting assembly of paragraph 1 and a panel having an aperture for receiving the sleeve of the fitting.

19. The fixing system of paragraph 18, wherein the aperture is shaped so as to substantially prevent the sleeve from moving relative to the panel in directions parallel to the plane of the panel.

20. The fixing system of paragraph 18, wherein the aperture is a slot that is shaped so as to permit movement of the sleeve relative to the panel along a single axis that is parallel to the plane of the panel.

21. The fixing system of paragraph 18, wherein the panel is a tailgate panel of a vehicle.

22. The fixing system of paragraph 18, comprising a stud for being received and restrained in the bore of the fitting.

23. The fixing system of paragraph 22, wherein the stud is connectable to a vehicle spoiler.

24. The fixing system of paragraph 23, wherein the stud is connected to a vehicle spoiler.

25. A vehicle comprising the fixing system of paragraph 18.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A fitting assembly for receiving and restraining a stud, the fitting assembly comprising:
    a sleeve defining a bore extending along a longitudinal axis of the fitting assembly, the sleeve comprising one or more restraining members that selectively restrain the stud within the bore such that an axial position of the stud is limited to a selected one of a plurality of positions within the bore;
    wherein the one or more restraining members are moveable between a first position and a second position, wherein axial movement of the stud within the bore is inhibited when the one or more restraining members are in the first position, and wherein axial movement of the stud within the bore is permitted when the one or more restraining members are in the second position; and
    a clamp attachable to the one or more restraining members that prevents movement of the one or more restraining members from the first position to the second position.

2. The fitting assembly of claim 1, wherein the one or more restraining members comprise one or more radially moveable portions and the first position is a radially inward position of the one or more radially moveable portions and the second position is a radially outward position of the one or more radially moveable portions.

3. The fitting assembly of claim 2, wherein the one or more radially moveable portions comprise one or more radially moveable fingers.

4. The fitting assembly of claim 2, wherein the one or more radially moveable portions comprise one or more radially inward projections that are configured to engage with one or more radially outward projections on the stud so as to inhibit axial movement of the stud within the bore.

5. The fitting assembly of claim 4, wherein the one or more radially inward projections comprise a plurality of teeth.

6. The fitting assembly of claim 4, wherein the one or more radially inward projections are tapered in an axial direction so that an axial force applied to the one or more radially inward projections causes a camming action that flexes the one or more radially moveable portions radially outwardly.

7. The fitting assembly of claim 6, wherein each radially inward projection of the one or more radially inward projections comprises a first face that is inclined relative to the longitudinal axis by a first angle and a second face that is inclined relative to the longitudinal axis by a second angle that is greater than the first angle, such that a first axial force applied to the first face causes the camming action that flexes the one or more radially moveable portions radially outwardly, and a second axial force applied to the second face causes the camming action that flexes the one or more radially moveable portions radially outwardly, wherein the second axial force is greater than the first axial force.

8. The fitting assembly of claim 1, further comprising a flange radially projecting from the sleeve.

9. The fitting assembly of claim 1, wherein the one or more restraining members are moveable so that the stud is received within the bore, and wherein the stud has a diameter of between 5 mm and 10 mm.

10. The fitting assembly of claim 1, wherein the clamp comprises a female screw thread, and wherein an outer surface of the sleeve comprises a male screw thread for threadably receiving the female screw thread of the clamp.

11. The fitting assembly of claim 10, wherein the clamp comprises a screw threaded locking nut configured to threadingly engage the male screw thread on the outer surface of the sleeve.

12. The fitting assembly of claim 1, wherein the clamp inhibits axial movement of the stud within the bore.

13. A fixing system, comprising:
    a stud; and
    a fitting assembly, comprising:
        a sleeve defining a bore and comprising one or more restraining members that restrain the stud within the bore such that an axial position of the stud within the bore is limited to a selected one of a plurality of positions;
        wherein the one or more restraining members are moveable between a first position and a second position, wherein axial movement of the stud within the bore is inhibited when the one or more restraining members are in the first position, and wherein axial movement of the stud within the bore is permitted when the one or more restraining members are in the second position; and a clamp attachable to the one or more restraining members that prevents movement of the one or more restraining members from the first position to the second position.

14. The fixing system of claim 13, wherein the stud comprises one or more radially outward projections.

15. The fixing system of claim 14, wherein the one or more radially outward projections comprise a screw thread on an outer surface of the stud.

16. A fixing system comprising the fitting assembly of claim 1 and a panel having an aperture that receives the sleeve of the fitting assembly.

17. The fixing system of claim 16, wherein the aperture is shaped so as to substantially prevent the sleeve from moving relative to the panel in directions parallel to a plane of the panel.

18. The fixing system of claim 16, wherein the aperture is a slot that is shaped so as to permit movement of the sleeve relative to the panel along a single axis that is parallel to a plane of the panel.

19. The fixing system of claim 16, wherein the panel is a tailgate panel of a vehicle.

20. A vehicle comprising the fixing system of claim 16.

* * * * *